(12) United States Patent
Dusi et al.

(10) Patent No.: US 8,584,789 B2
(45) Date of Patent: Nov. 19, 2013

(54) ASSEMBLY FOR HANGING A VIBRATION-GENERATING MEMBER ATTACHED INSIDE AN AXLE OF AN AUTOMOBILE RUNNING GEAR

(75) Inventors: Jacques Dusi, Gretz Armainvilliers (FR); Dominique Poupard, Chaville (FR); Herve Remond, Plessis St Jean (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 95 days.

(21) Appl. No.: 13/395,416

(22) PCT Filed: Sep. 8, 2010

(86) PCT No.: PCT/FR2010/051869
§ 371 (c)(1),
(2), (4) Date: Mar. 9, 2012

(87) PCT Pub. No.: WO2011/030056
PCT Pub. Date: Mar. 17, 2011

(65) Prior Publication Data
US 2012/0168599 A1 Jul. 5, 2012

(30) Foreign Application Priority Data

Sep. 11, 2009 (FR) ...................................... 09 56234

(51) Int. Cl.
*B60K 5/12* (2006.01)
*B62D 21/11* (2006.01)

(52) U.S. Cl.
USPC ............ 180/382; 180/312; 180/377; 180/300

(58) Field of Classification Search
CPC ....... B60K 5/12; B60K 5/1208; B60K 5/1216
USPC .......... 180/291, 292, 299, 300, 312, 378, 377
IPC ......................................................... B60K 5/12
See application file for complete search history.

(56) References Cited

U.S. PATENT DOCUMENTS

| 4,449,603 | A | | 5/1984 | Langwieder et al. |
| 4,560,027 | A | * | 12/1985 | Murakami et al. ............ 180/312 |

(Continued)

FOREIGN PATENT DOCUMENTS

| DE | 3202256 A1 | 7/1983 |
| DE | 4307999 A1 | 9/1994 |

(Continued)

OTHER PUBLICATIONS

International Search Report from corresponding International Application No. PCT/FR2010/051869 mailed Nov. 30, 2010.

*Primary Examiner* — Ruth Ilan
(74) *Attorney, Agent, or Firm* — Polster Lieder Woodruff & Lucchesi, L.C.

(57) ABSTRACT

The invention relates to an assembly for hanging a vibration-generating member (8) attached inside an axle (3) of a running gear of a vehicle, in particular an automobile, said member (8) being attached to the axle (3) by at least one first (9A), one second (9B) and one third (9C) anti-vibration attachment elements, the three attachment elements (9A, 9B, 9C) not being on the same horizontal plane XY, said attachment elements (9A, 9B, 9C) providing isostatic hanging of the member (8) in the axle (3), and in which the first and second attachment elements (9A and 9B) are arranged separated from one another and aligned on a diagonal connecting the center of the first attachment element (9A) with the center of the second attachment element (9B), passing through the center of gravity of the member (8); the third attachment element (9C), separated from the first and second attachment elements (9A, 9B), does not pass through said diagonal line; and the center of the third attachment element (9C) and the center of gravity of the member (8) pass through the same horizontal plane XY.

7 Claims, 5 Drawing Sheets

(56) References Cited

U.S. PATENT DOCUMENTS

| | | | |
|---|---|---|---|
| 4,564,082 A * | 1/1986 | Takehara et al. | 180/312 |
| 5,454,443 A | 10/1995 | Fischle et al. | |
| 6,155,372 A * | 12/2000 | Hirasaka | 180/297 |
| 6,708,793 B2 * | 3/2004 | Witherspoon et al. | 180/291 |
| 7,575,087 B2 * | 8/2009 | Kim | 180/299 |
| 2002/0144852 A1 * | 10/2002 | Shimizu et al. | 180/300 |
| 2003/0024755 A1 * | 2/2003 | Gesser | 180/291 |
| 2005/0079068 A1 * | 4/2005 | Shigematsu | 417/363 |
| 2005/0211492 A1 * | 9/2005 | Mori et al. | 180/292 |

FOREIGN PATENT DOCUMENTS

| | | |
|---|---|---|
| DE | 19710091 A1 | 10/1997 |
| DE | 19802805 A1 | 7/1999 |
| FR | 895171 A | 1/1945 |
| FR | 2504864 A1 | 11/1982 |
| JP | 2001097050 A | 4/2001 |

* cited by examiner

ASSEMBLY FOR HANGING A VIBRATION-GENERATING MEMBER ATTACHED INSIDE AN AXLE OF AN AUTOMOBILE RUNNING GEAR

CROSS-REFERENCE TO RELATED APPLICATIONS

This application is the U.S. National stage, under 35 U.S.C. §371, of International App. No. PCT/FR2010/051869 which was filed on Sep. 8, 2010 and claims priority to French Application No. 0956234 which was filed on Sep. 11, 2009, and which is incorporated herein by reference.

BACKGROUND OF THE INVENTION

The suspension assembly of a vibration generating device fixed inside an axle of running gear of a vehicle, specifically an automotive vehicle is described.

It applies more particularly, but not exclusively, to a rear drive axle of a hybrid automotive vehicle supporting a drive unit including an electric traction machine.

The term axle is generally used to define a transverse connection piece joining the wheels of a vehicle. This transverse connection piece is also called a crossmember. The axle is equipped with various pieces connecting to the ground usually present in a running gear of an automobile vehicle. Specifically the axle supports suspension arms connecting the wheels to the vehicle. The axle is joined to the vehicle chassis in a known way by means of attachments such as pivot type joints.

The axle is arranged to support, the connection parts to the ground, noted above, and a motor device mounted suspended inside the axle which is a generator of vibrations.

The motor device may be an internal combustion engine or an electric traction machine, and generally any vibration generating device, vibrations that should be filtered to prevent their propagation toward the cabin. These vibrations are generated specifically by the acyclic movements well known in the internal combustion engines, but that exist also in the electric machines developing significant power and, specifically in the electric machines used for traction of the vehicles. These vibrations, combined with those generated by the wheels' suspensions, are transmitted to the chassis of the vehicle and are sources of discomfort for the occupants of the vehicle.

Document FR 2 837 754 discloses a suspension architecture of a drive unit in an automotive vehicle chassis.

FR 2 837 754 will be referenced usefully to understand the problems of the suspensions of the motors and to familiarize oneself with the vocabulary that will be used in this description.

The two main types of suspension motor architecture are: suspensions called "pendulée" (swinging), used specifically by the auto maker PSA Peugeot Citroën; and suspensions called "posée" (composed) used specifically by the auto maker Toyota.

The choice of the suspension architecture type is dictated specifically by the type of motor device used: the suspension modes generated by the device motor and the stresses due to the weight of the motor device and its torque, as well as the desired installation of the motor device in the vehicle.

In the case of an electric machine, the so-called swinging architecture, is difficult to install and not of interest because the electric machine does not generate any stress called "pilon" (tamper) as is the case with a standard internal combustion engine.

The architecture called "posée" (compose) implies the design of parts that must withstand the stresses, due to the weight of the machine, as well as its torque, following the one and same direction along the Z axis, while considering the three-dimensional reference coordinates X Y Z illustrated in FIG. 1.

This reference system will be used in the entire description that follows to describe in space, the axle and the element carriers of the electric machine with the convention:
- the X axis, oriented from the front to the rear of the vehicle 1;
- the Y axis, oriented from the left side of the vehicle 1 to the right of the vehicle 1 (while looking at the vehicle head on, facing the front of the vehicle 1); and
- the axis Z, oriented from bottom to top.

This architecture implies that the six suspension modes, enumerated in the document FR 2 837 754, are coupled together and are hardly "configurable".

Neither of these two architectures is satisfactory to respond to the dual constraint linked to the installation of an electric machine within a running gear which is itself suspended.

BRIEF SUMMARY

We remedy this drawback by proposing a new architecture called "in diagonal" which permits management of the suspension modes of the running gear as well as the modes related to the suspension of the electric machine and does so in decoupled fashion.

A suspension assembly of a vibration generating device is fixed inside an axle of vehicle running gear, specifically an automobile vehicle. The device is fixed on the axle by at least one first, one second and one third shock absorbing attachment element. The three shock absorbing attachment elements do not lie in the same horizontal XY plane. The elements ensure an isostatic suspension of the device in the axle, in which the first and second attachment elements are arranged far from one another and are aligned on a diagonal joining the center of the first attachment element and the center of the second attachment element, passing through the center of gravity of the device. The third attachment element, remote from the first and second attachment elements, does not pass through this diagonal. The center of the third attachment element and the center of gravity of the device pass through the same XY horizontal plane.

According to one characteristic, the diagonal is centered essentially on the Y axis passing through the center of gravity of the device to balance the stresses in the shock absorbing attachment elements.

According to another characteristic, the first and second shock absorbing attachment elements are placed on one of the terminal parts of the vibration generating device along the general X direction, and the third shock absorbing attachment element is placed on the other terminal part along the same general X direction.

In one embodiment, the axle includes a set of tubular elements defining a cage of general parallelepiped shape for the vibration generating device. The shock absorbing attachment elements are fixed respectively, in a flexible manner, to the vibration generating device on certain tubular elements, called carrier tubular elements.

According to one characteristic of this embodiment, every shock absorbing attachment element includes an arm where a first end is fixed on the vibration generating device and where the second end is provided with a drilled hole capable of receiving a pivot type joint.

According to another characteristic, the joint includes a plate solidly attached to the tubular carrier; the axis of the plate interacting with the drilled hole of the second end of the arm by means of an elastometric filtering material housed in the drill hole.

According to another characteristic, the first end of the arm of the third shock absorbing element defines an attachment plate extending along the X axis and in which the second end extends perpendicularly to the plate along the Y axis. The drill hole axis extends along the X axis.

According to another characteristic, the plate extends along the X axis, projecting from the electric machine, to define a bearing arranged with respect to the output of the electric machine; the bearing being able to receive for rotation an output shaft of the electric machine.

BRIEF DESCRIPTION OF THE SEVERAL VIEWS OF THE DRAWINGS

The invention shall be better understood by reading the description that follows, given solely as a non restrictive example and made by referring to the attached drawings on which.

In the figures, the same elements are designated by the same numeric references.

DETAILED DESCRIPTION

In the following description, the features and functions well known to those skilled in the art shall not be described in detail.

Figure 1:
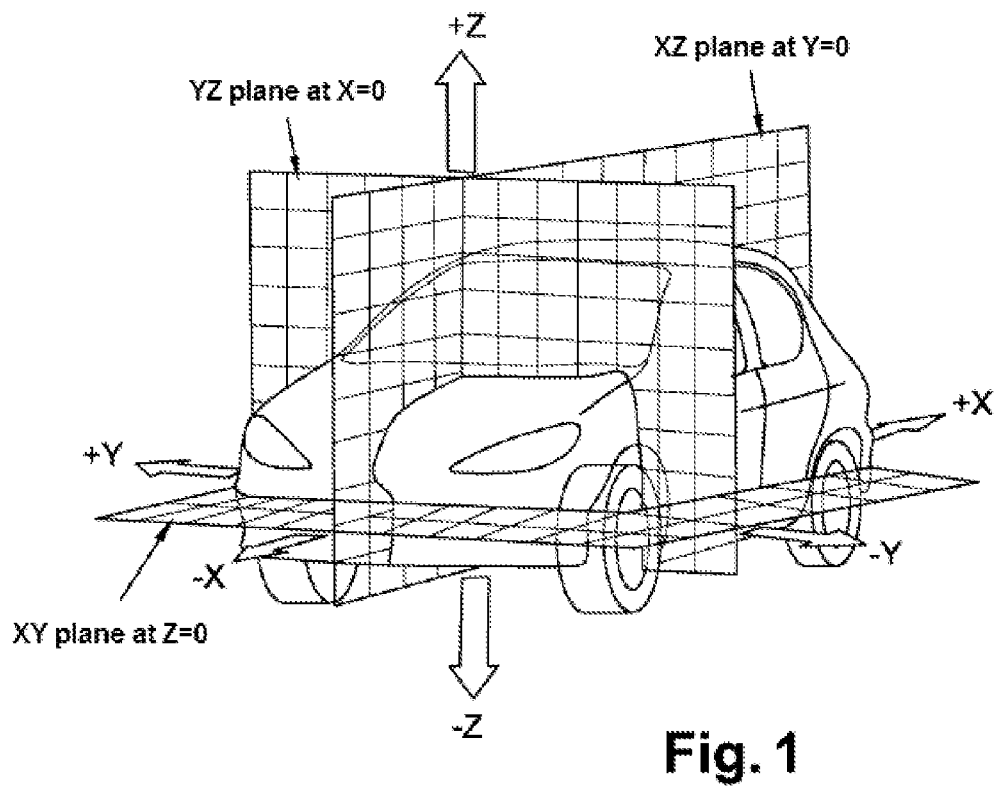
FIG. 1 is a three-dimensional reference system used to describe the space of the axle and the carrier elements of the electric machine.
Figure 2:
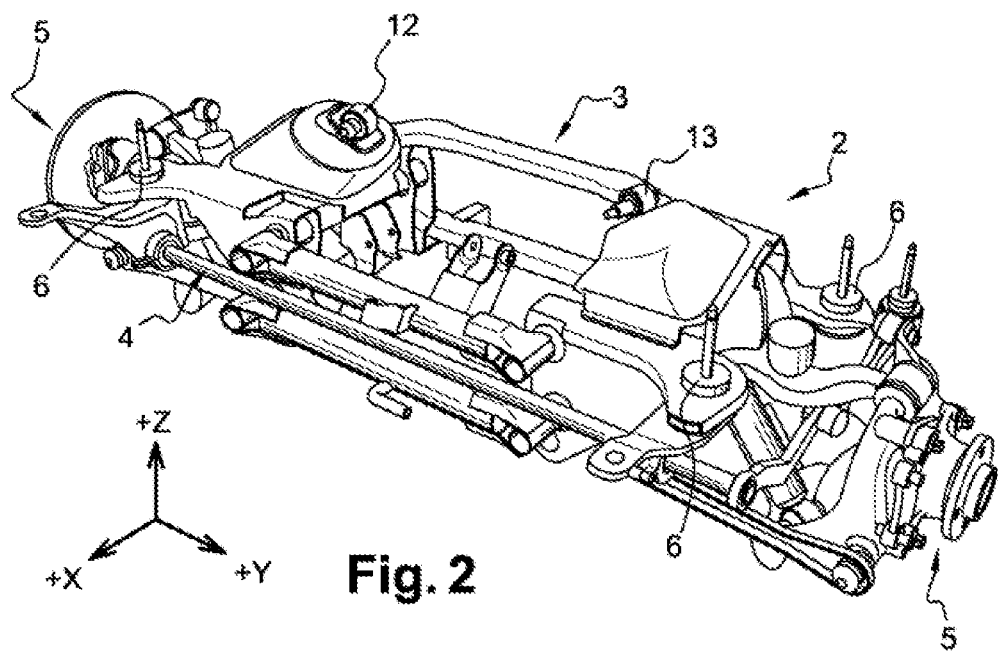
FIG. 2 is a perspective view of a complete running gear according to the invention, represented without the motor device.

FIG. 2 represents a train 2, for example, a rear running gear of an automobile vehicle.

This train 2 includes, in a classic manner, an axle 3, a anti-roll bar 4, the attachment elements of the wheels of the vehicle 1 and other connection elements to ground not detailed here, grouped under the numeric reference 5 (the wheels are not represented on this figure) as well as the attachments 6 of the train 2 on the chassis of the vehicle 1.

Figure 3:
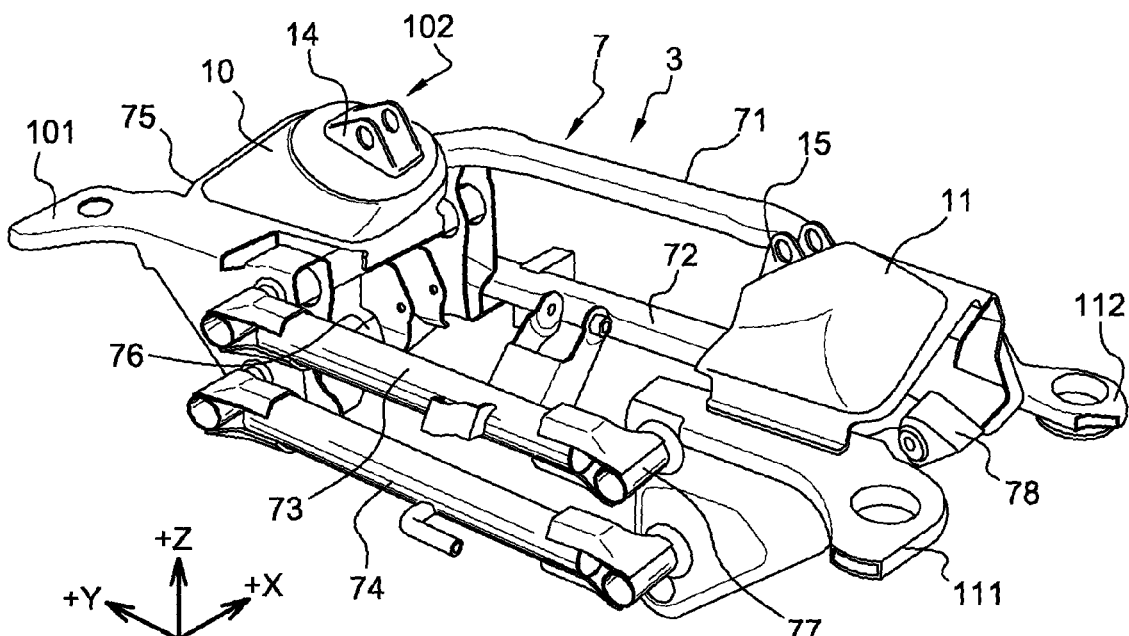
FIG. 3 is a perspective view of the axle itself, according to the invention.

FIG. 3 represents the axle 3 itself. It is an axle of mechanic welded type. It is formed by an assembly 7 of tubular elements welded together, and two subsets 10 and 11, symmetrical in relation to the longitudinal axis X, forming attachment plates for the left suspension assembly 12 and right suspension assembly 13 by means of plates 14 and 15, also welded on the assembly of tubular elements 7. The axle 3 also includes four sheet metal protuberances forming horns 101, 102, 111 and 112, arranged essentially at the four angles of the axle 3 and that are able to receive the attachment devices 6 of the axle 3 on the chassis of the vehicle 1.

This axle 3 performs only the function of a deformable crossmember 25 able to absorb the torsion stresses between the wheels.

Figure 4:
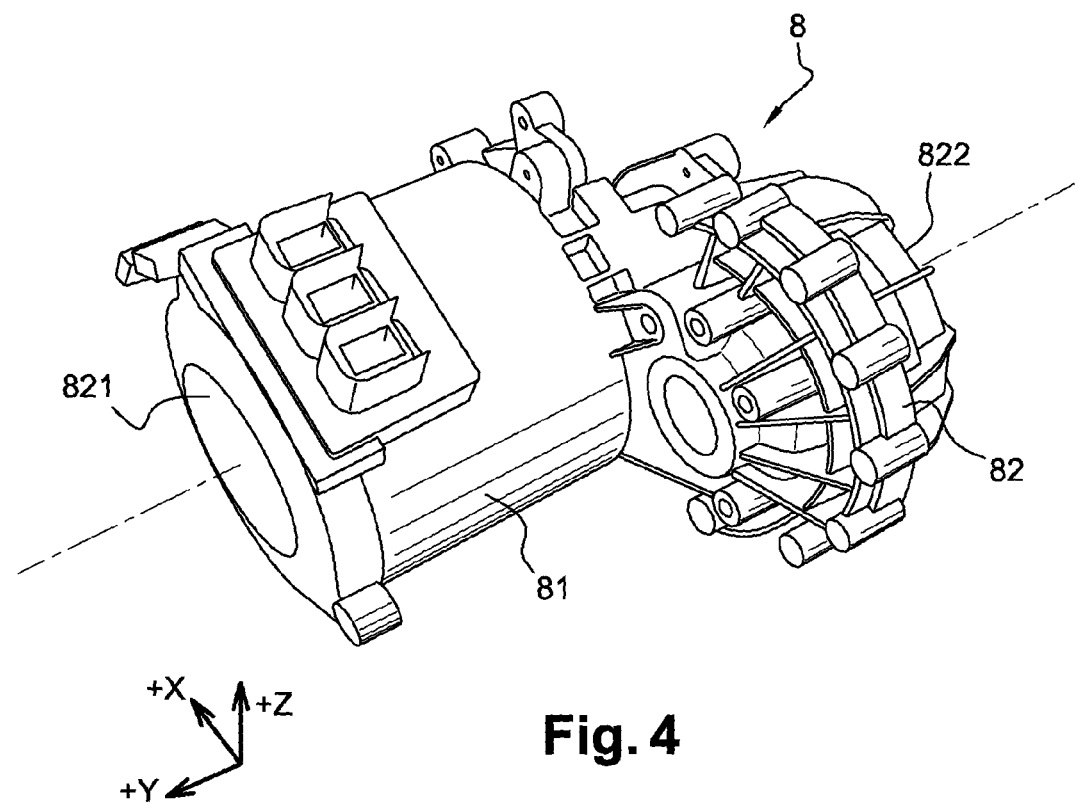
FIG. 4 is a perspective view of an electric machine coupled to a coupling to a gear box comprising a speed reducer and a differential.

In the example described, eight tubular elements 71 to 78, six of which, 71-75 and 77, are of straight circular cross-section and are assembled together in order to constitute a structural frame of general parallelepiped form, defining a receptacle or cage, for an assembly or motor device 8 and specifically an electric machine 81 and its gearing and associated differential as illustrated in FIG. 4. The gearing and the differential are housed in the same gear box 82.

This assembly will be designated hereunder, simply by electric machine 8.

The motor device in the example describes an electric traction machine of about 20 kW and a weight of about 60 kg.

Figure 5:
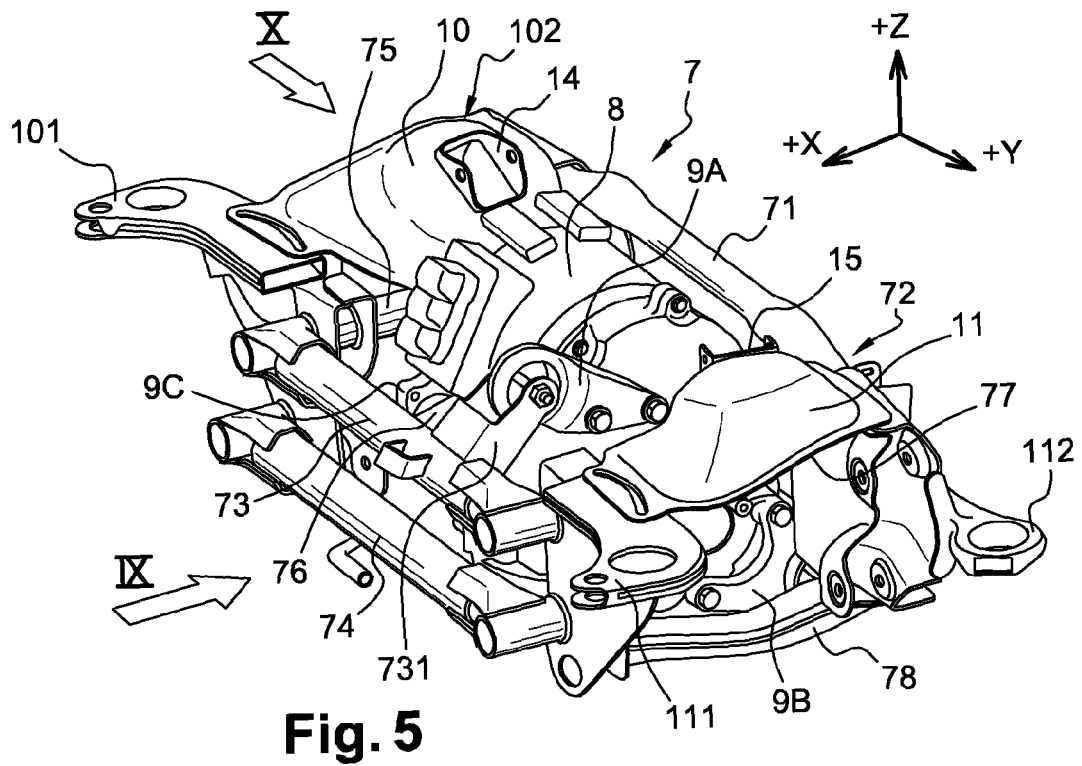
FIGS. 5 and 6 are perspective views of the axle supporting the electric machine of the FIG. 4, following the X axis and the Y axis respectively.
Figure 6:
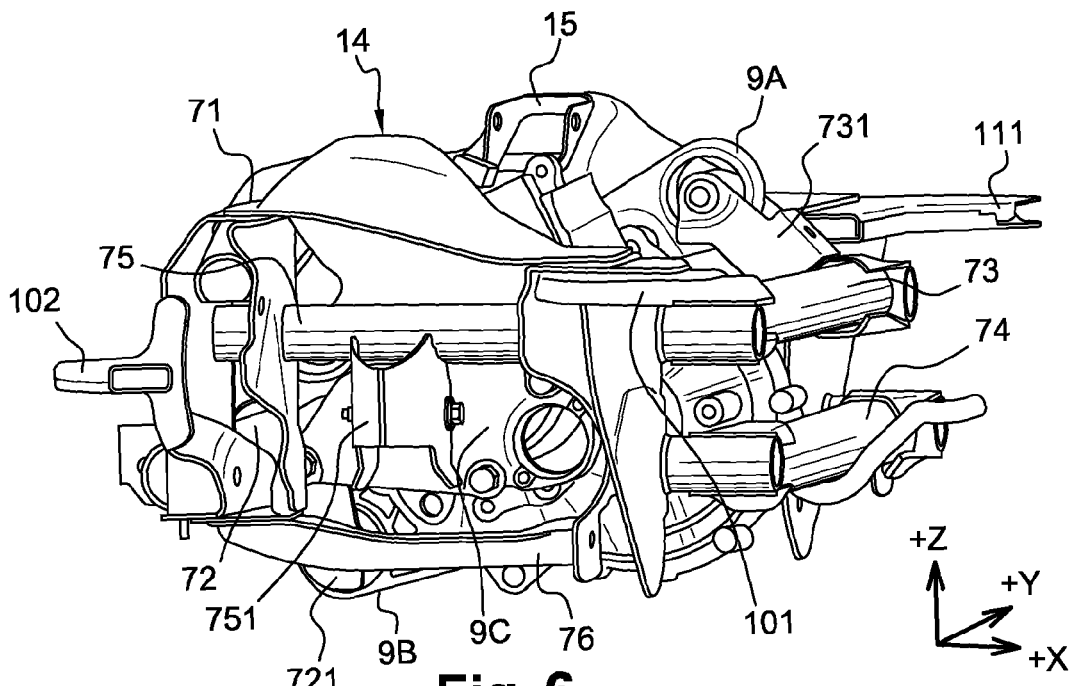

FIGS. 5 and 6 represent the axle 3 supporting the electric machine 8 according to two different angles of view: FIG. 5 is a view along the X axis and FIG. 6 is a view along the Y axis The electric machine 8 is fixed inside the axle 3 and more precisely inside the cage formed by the tubular elements 71 to 78. The electric machine 8 is fixed by being suspended mechanically with the tubular assembly 7 by three shock absorbing attachment elements 9A, 9B and 9C in order to define an isostatic suspension system.

These three attachment elements 9A, 9B and 9C are installed precisely to respond to the dual constraint evoked in the preamble of this description, namely, to optimize the positioning of the electric machine 8 inside axle 3 to satisfy, at one time, the isostatism of the suspension and the following two levels of filtering:

filtering of the vibrations generated by the wheels and going up through the axle 3 towards the chassis of the vehicle 1, and filtering of the vibrations of the electric machine 8, suspended inside the axle 3.

Figure 9:
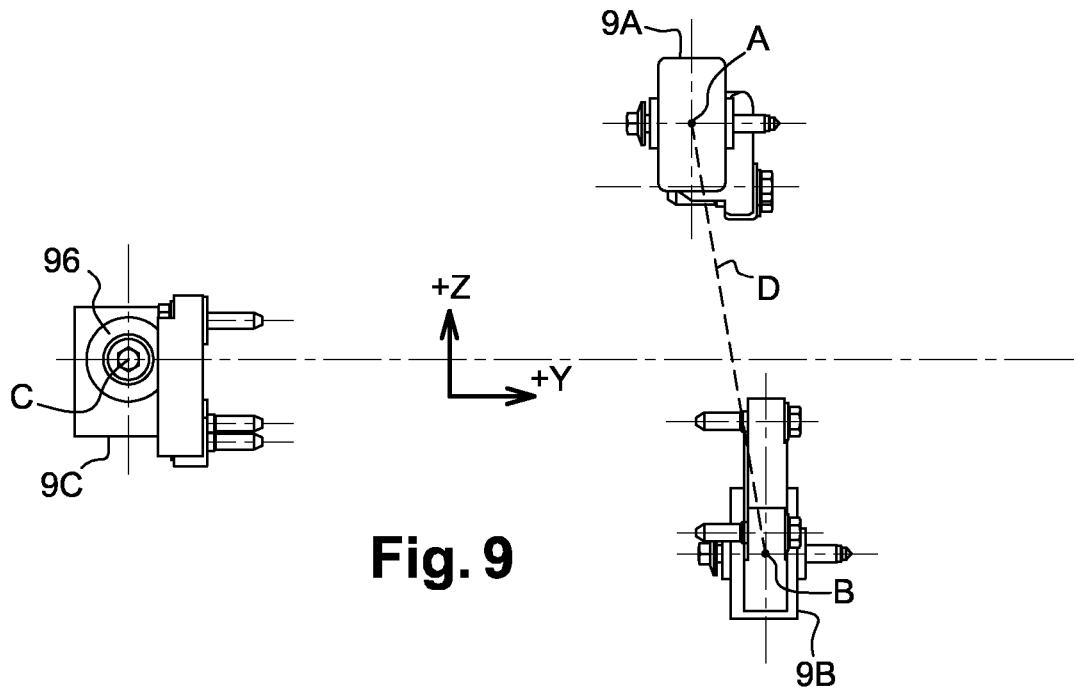
FIGS. 9 and 10 represent the same installation example respectively according to face views, following the X axis, and lateral, following the Y axis, of the axle according to the invention equipped with the electric machine.

Among these three attachment elements 9A, 9B and 9C, two attachment elements 9A and 9B are distinguished that, on considering FIG. 9, are to the right of the figure.

The third attachment element 9C is to the left on the FIG. 9. The three attachment elements 9A, 9B and 9C are not in the same horizontal XY plane.

Figure 7:
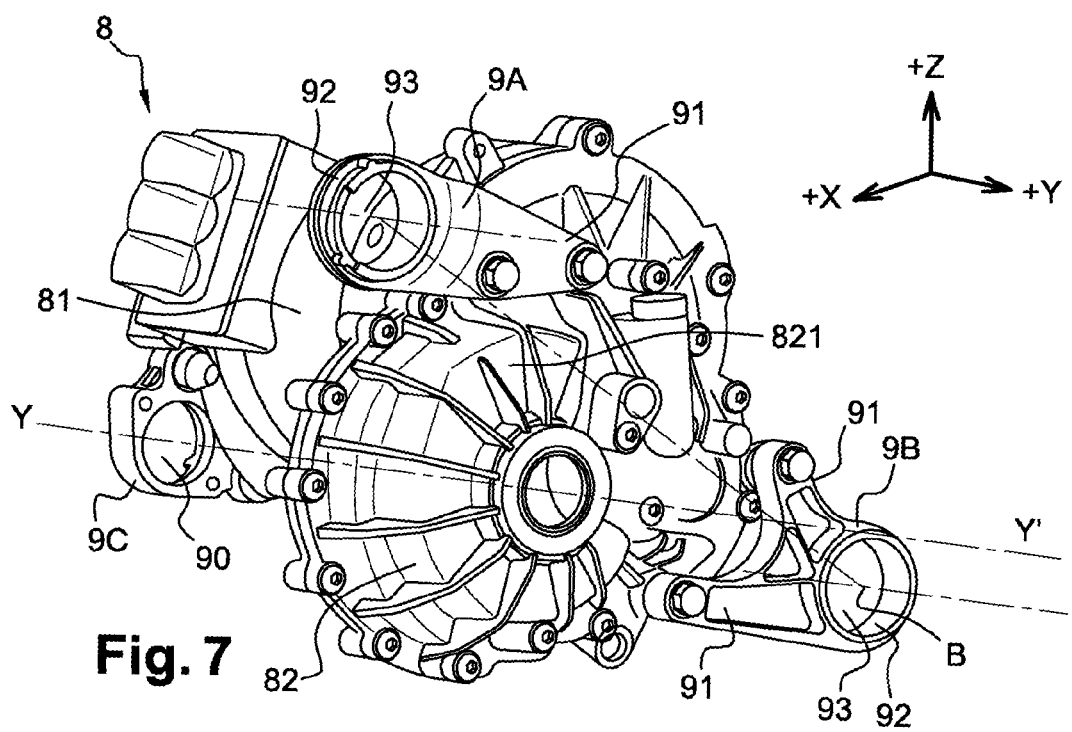
FIGS. 7 and 8 are perspective views of the electric machine of FIG. 4 equipped with its attachment elements, following, respectively the X axis and the Y axis.
Figure 8:
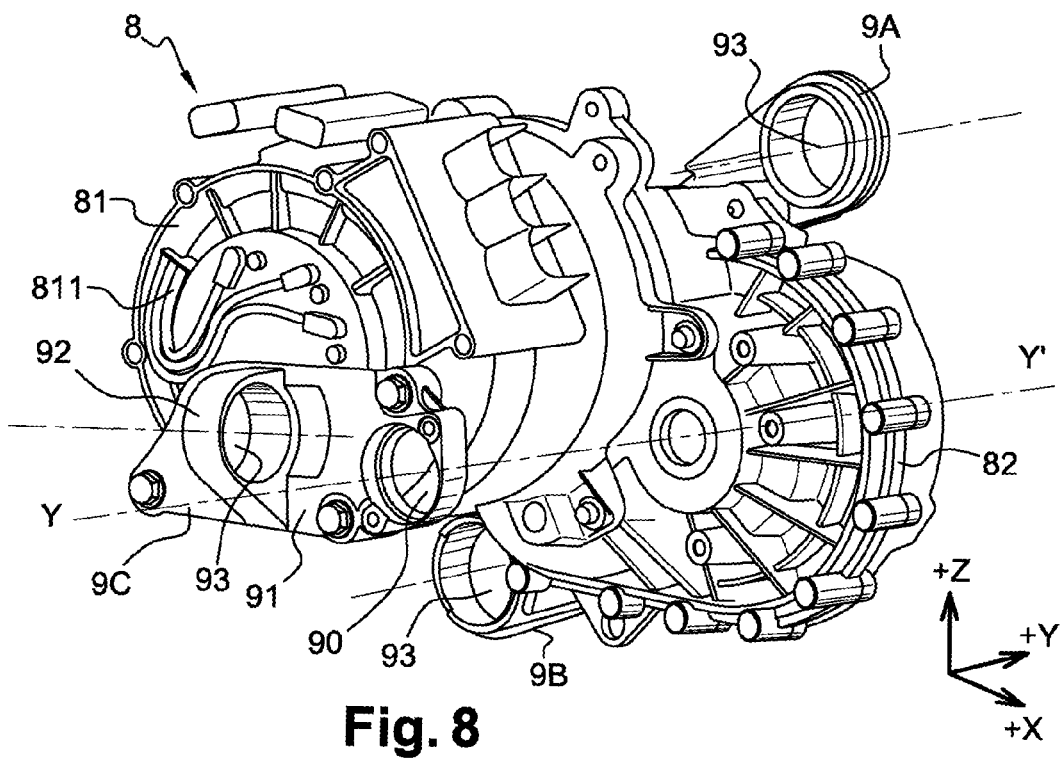

On FIGS. 7 and 8, the electric machine 8 is represented only equipped with the attachment elements 9A, 9B and 9C according to essentially the same angles of view as those of FIGS. 5 and 6.

Figure 10:
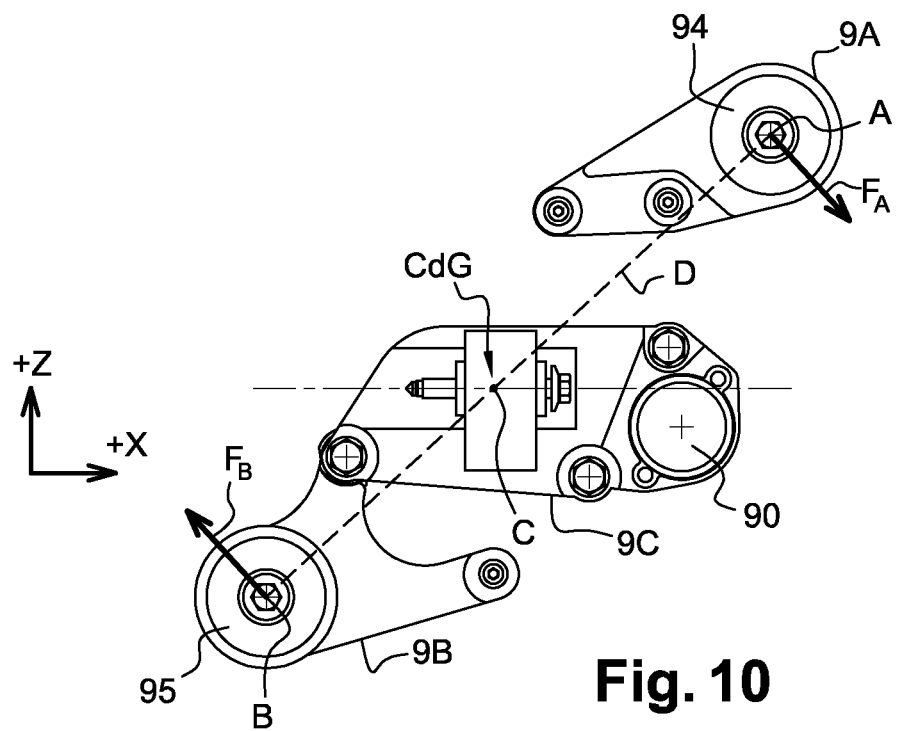

The first and second attachment elements 9A, 9B are presented in the form of attachment feet or arms. A first end 91 of the arm is fixed on the electric machine 8, or more precisely on the external face, or terminal face 822, of the reducing-differential gearbox 82, that extends, along the Y axis, from the electric machine 81. The arms 9A, 9B are fixed on the external face 822 by at least two attachment bolts. The second end 92 of the arms 9A, 9B are fixed on one of the tubular elements, called a tubular element carrier, by joints of pivot type, including an elastomeric material 94, 95 filtering the vibrations (FIGS. 9 and 10).

More precisely, the second end 92 of the arms 9A, 9B are provided with a drilled hole 93 able to receive the elastomeric material 94, 95 and the axis of a plate 731, 751. The plate 751 is fixed solidly to one of the tubular carrier elements 73, 75.

The attachment elements 9A, 9B define shock absorbing attachment elements which are able to filter the suspension modes.

These two attachment elements 9A and 9B by themselves mainly ensure keeping the electric machine 8 on the axle 3.

In reference to FIGS. 9 and 10, that represent the installation of the three attachment elements 9A, 9B, 9C, respectively, on the axle 3, according to two different angles of view, it is noted that the attachment elements 9A and 9B are aligned along a straight segment called diagonal D. This diagonal D leaves from one point A corresponding to the center of the shock absorbing attachment element 94 arranged at the second end 92 of the arm 9A. It arrives at a point B corresponding to the center of the shock absorbing attachment element 95 arranged at the second end 92 of the arm 9B.

In order to distribute the stresses optimally on the attachment elements 9A, 9B, this diagonal D traverses by a straight line, on the horizontal axis Y, connecting a corresponding point C to the center of the attachment element 9C and the center of gravity CdG of the electric machine 8 (the electric machine 81 and the gear box 82 in the example described). The length of the segment AB, thus the diagonal D, must be sufficient to limit the stresses at the level of the connection pieces: attachment elements 9A, 9B, shock absorbing attachment element 94, 95, joints, etc., in order to permit the design and the manufacture of simple, less expensive parts, which have to withstand less stress; where the stress depends on the torque developed by the electric machine 8. By way of example, the length of the AB segment is of about 500 mm for an electric machine of 20 kW developing a maximum torque of 200 N/m.

The diagonal D "covers in Z" the weight of the electric machine 8. This stress, whose direction is along the Z axis, is distributed on the two attachment elements 9A and 9B.

Advantageously, the axes of the attachment elements 9A and 9B pass respectively through the points A and B, and are oriented orthogonally in the XZ plane.

Advantageously, the filtering contributed by the elastomeric materials 94 and 95 that are accommodated in the attachment elements 9A and 9B follows the torque direction of the machine. The torque direction of the machine is represented, on FIG. 10, by two arrows FA and FB, whose origins leave respectively from the centers A and B of the attachment elements 9A and 9B. These arrows FA and FB are representative of the reaction forces of the machine torque 8 on the attachment elements 9A and 9B. Through reasons of deviations in the manufacturing tolerances, the axes of the attachment elements 9A and 9B, in practice, are oriented "essentially" orthogonal to the diagonal D.

The third attachment element 9C, or left attachment, is arranged on the horizontal Y axis that passes through the center of gravity CdG of the electric machine 8.

With such an arrangement, the attachment element 9C practically does not support either the weight or the torque of the electric machine 8. One says that the attachment element 9C does not see the torque of the electric machine.

Advantageously, the axis of the attachment element 9C is oriented along the X axis so that filtering contributed by this element is effectively following the torque direction, this in order to save a joint usually used to dampen the "shudder" type effects: effects that are encountered on all rear trains of automotive vehicles and that are translated, in haulage, by an oscillation of the rear train along the Y axis of the vehicle.

Therefore naturally this third attachment element 9C will be exploited to fix the output shaft of the electric machine 8 (corresponding to the output of the differential), symbolized on FIGS. 7 and 8 by its YY' axis, as described below.

The attachment element 9C is distinguished by its shape and its installation of the two other attachment elements 9A and 9B described above. By taking the term of arm used to define the shock absorbing attachment elements 9A and 9B, the first end of the arm 9C is presented in the form of a plate extending along the X axis, the base 91 of which is fixed by three attachment bolts on the lateral external face, or terminal face 811, of the electric machine 8. The second end of the arm 9C includes an extension 92 extending perpendicularly to the base 91 toward the outside of the electric machine 8 along the Y direction. This extension is provided with a drilled hole 93 able to receive a pivot type joint including a vibration filtering material 96, of elastomer type, and the axis 15 of a plate 751. The plate 751 is fixed solidly to the tubular carrier element 75.

The attachment element 9C and the attachment elements 9A, 9B thus define shock absorbing attachment elements all participating in the filtering of the suspension modes.

The base 91 of the attachment element 9C continues along the X axis, protruding from the electric machine 8 to present another drilled hole 90 coming with respect to the output of the electric machine 8 (corresponding to the output of the gear box 82) and thus to define a bearing for the output shaft YY'.

Thus, it is the same attachment element 9C that participates in the isostatic suspension of the electric machine 8 and in the securing of the YY' output shaft.

The installation that has just been described is especially adapted to be able to manage the suspension modes of the electric machine in a train which itself has its own suspension modes.

By imposing stiffeners determined in Z and in X for the two attachment elements 9A and 9B, belonging to the same diagonal D, as well as a stiffener determined for the third attachment element 9C, aligned with the center of gravity CdG, it is relatively simple to define a modal diagram taking into account the six modes of suspension of a motor device in a context of a running gear of an automobile vehicle.

Other embodiments are possible. One can, for example, reverse the left right positioning of the attachment elements.

As already described above, the suspension assembly can also be used to fix an internal combustion motor or any vibration generating device that it is sought to filter.

It can also apply to a front running gear of the vehicle.

The invention claimed is:

1. A suspension assembly for a vibration generating device fixed inside an axle of a running gear of a vehicle comprising the device being fixed to the axle by at least one first, one second, and one third shock absorbing attachment elements, the three attachment elements not lying in the same horizontal XY plane, the attachment elements ensuring the isostatic suspension of the device in the axle, wherein the first and second attachment elements are arranged one far from the other and aligned on a diagonal (D) joining the center (A) of the first attachment element and the center (B) of the second attachment element by passing through a straight line, on the horizontal axis Y, joining the center (C) of the third attachment element and the center of gravity (CdG) of the device; the third attachment element, far from the first and second attachment elements, not passing through the diagonal (D); the center (C) of the third attachment element and the center of gravity (CdG) of the device passing through the same horizontal XY plane, wherein the first and second shock absorbing attachment elements are placed on a first terminal part of the vibration generating device extending in the general Y direction, and the third shock absorbing attachment element is placed on a second terminal part in the same general Y direction.

2. The suspension assembly according to claim 1, wherein the diagonal (D) is essentially centered on the Y axis passing through the center of gravity (CdG) to balance the stresses in the shock absorbing attachment elements.

3. The suspension assembly according to claim 1, wherein the axle comprises an assembly of tubular elements defining a cage of general parallelepiped form for the vibration generating device, the shock absorbing attachment elements being flexibly attached to the vibration generating device on certain of the tubular elements.

4. The suspension assembly according to claim 3, wherein every shock absorbing attachment element includes an arm on a first end of which is fixed the vibration generating device and where a second end is provided with a drilled hole adapted to receive a pivot type joint.

5. The suspension assembly according to claim 4 wherein the joint includes a plate solidly joined to the tubular carrier element, the axis of the plate connects with the drilled hole of the second end of the arm by means of a filtering material of elastomer type housed in the drilled hole.

6. The suspension assembly according to claim 5, in which the first end of the arm of the third shock absorbing element defines an attachment plate extending along the X axis and in which the second end extends perpendicularly to the plate along the Y axis; and the axis of the drilled hole extends along the X axis.

7. The suspension assembly according to claim 6, in which the plates extend along the X axis, and protrude from the vibration generating device, to define a bearing arranged with respect to the output of the vibration generating device; the bearing being able to receive a rotating output shaft of the vibration generating device.

* * * * *